US012659147B2

(12) United States Patent
Park

(10) Patent No.: US 12,659,147 B2
(45) Date of Patent: Jun. 16, 2026

(54) DATA OWNER DEVICE AND ITS DATA MANAGEMENT METHOD FOR USER-CENTRIC DATA MANAGEMENT THROUGH AUTHENTICATION AND KEY AGREEMENT BASED ON SINGLE AGGREGATE KEY

(71) Applicant: Electronics and Telecommunications Research Institute, Daejeon (KR)

(72) Inventor: Kisung Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 143 days.

(21) Appl. No.: 18/623,153

(22) Filed: Apr. 1, 2024

(65) Prior Publication Data

US 2024/0333494 A1  Oct. 3, 2024

(30) Foreign Application Priority Data

Mar. 30, 2023  (KR) ........................ 10-2023-0041866

(51) Int. Cl.
*H04L 29/06* (2006.01)
*H04L 9/08* (2006.01)

(52) U.S. Cl.
CPC .................................... *H04L 9/088* (2013.01)

(58) Field of Classification Search
CPC ...... H04L 9/088; H04L 9/3263; H04L 9/3236
See application file for complete search history.

(56) References Cited

U.S. PATENT DOCUMENTS

| 10,558,589 B1 * | 2/2020 | de Cesare | G06F 21/78 |
| 2021/0294915 A1 * | 9/2021 | In | G06F 21/6227 |
| 2022/0038267 A1 * | 2/2022 | Dugardin | H04L 9/3236 |
| 2022/0237695 A1 * | 7/2022 | Hwang | G06Q 20/3825 |

FOREIGN PATENT DOCUMENTS

| KR | 10-1464727 B1 | 11/2014 |
| KR | 10-2401485 B1 | 5/2022 |

OTHER PUBLICATIONS

Wang et al., "Efficient Verifiable Key-Aggregate Keyword Searchable Encryption for Data Sharing in Outsourcing Storage," in IEEE Access, vol. 8, pp. 11732-11742 (Year: 2020).*
Chen et al., "A Bilinear Map Pairing Based Authentication Scheme for Smart Grid Communications: PAuth," in IEEE Access, vol. 7, pp. 22633-22643 (Year: 2019).*

* cited by examiner

*Primary Examiner* — Morshed Mehedi
(74) *Attorney, Agent, or Firm* — Sughrue Mion, PLLC

(57) ABSTRACT

Provided is a data management method of user-centric data management through authentication and key agreement based on a single aggregate key. The method includes adding a keyword to data and encrypting the data according to a predetermined encryption technique; storing the encrypted data in a personal storage; receiving a data request from a data user terminal; and transmitting a single aggregate key required for the encrypted data to the data user terminal in response to the data request.

15 Claims, 6 Drawing Sheets

FIG. 4

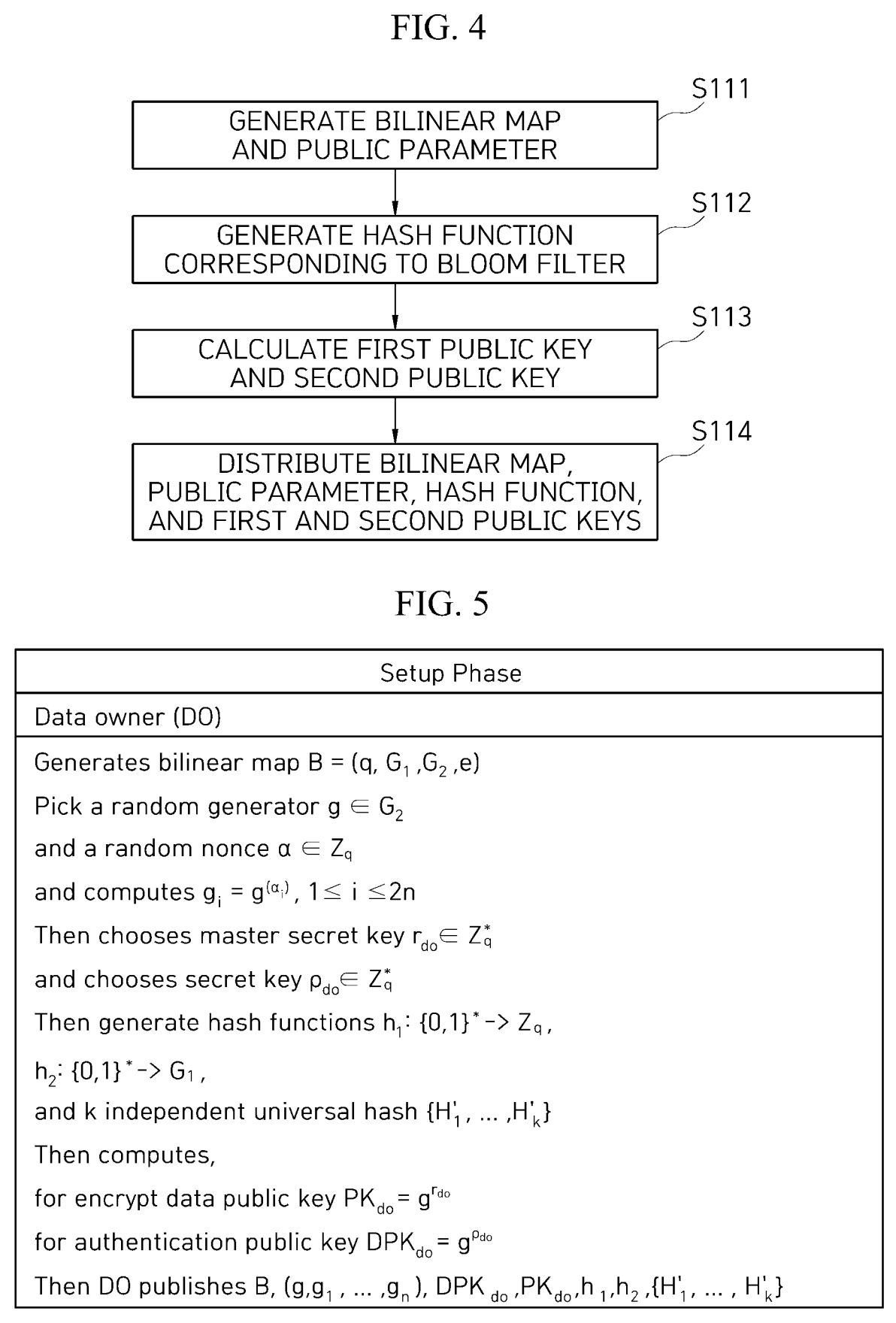

GENERATE BILINEAR MAP
AND PUBLIC PARAMETER          S111

GENERATE HASH FUNCTION
CORRESPONDING TO BLOOM FILTER     S112

CALCULATE FIRST PUBLIC KEY
AND SECOND PUBLIC KEY        S113

DISTRIBUTE BILINEAR MAP,
PUBLIC PARAMETER, HASH FUNCTION,
AND FIRST AND SECOND PUBLIC KEYS    S114

FIG. 5

| Setup Phase |
|---|
| Data owner (DO) |
| Generates bilinear map $B = (q, G_1, G_2, e)$ |

Pick a random generator $g \in G_2$ and a random nonce $\alpha \in Z_q$ and computes $g_i = g^{(\alpha_i)}$, $1 \leq i \leq 2n$ Then chooses master secret key $r_{do} \in Z_q^*$ and chooses secret key $\rho_{do} \in Z_q^*$ Then generate hash functions $h_1: \{0,1\}^* \rightarrow Z_q$, $h_2: \{0,1\}^* \rightarrow G_1$, and k independent universal hash $\{H_1', \ldots, H_k'\}$ Then computes, for encrypt data public key $PK_{do} = g^{r_{do}}$ for authentication public key $DPK_{do} = g^{\rho_{do}}$ Then DO publishes $B$, $(g, g_1, \ldots, g_n)$, $DPK_{do}$, $PK_{do}$, $h_1$, $h_2$, $\{H_1', \ldots, H_k'\}$

FIG. 6

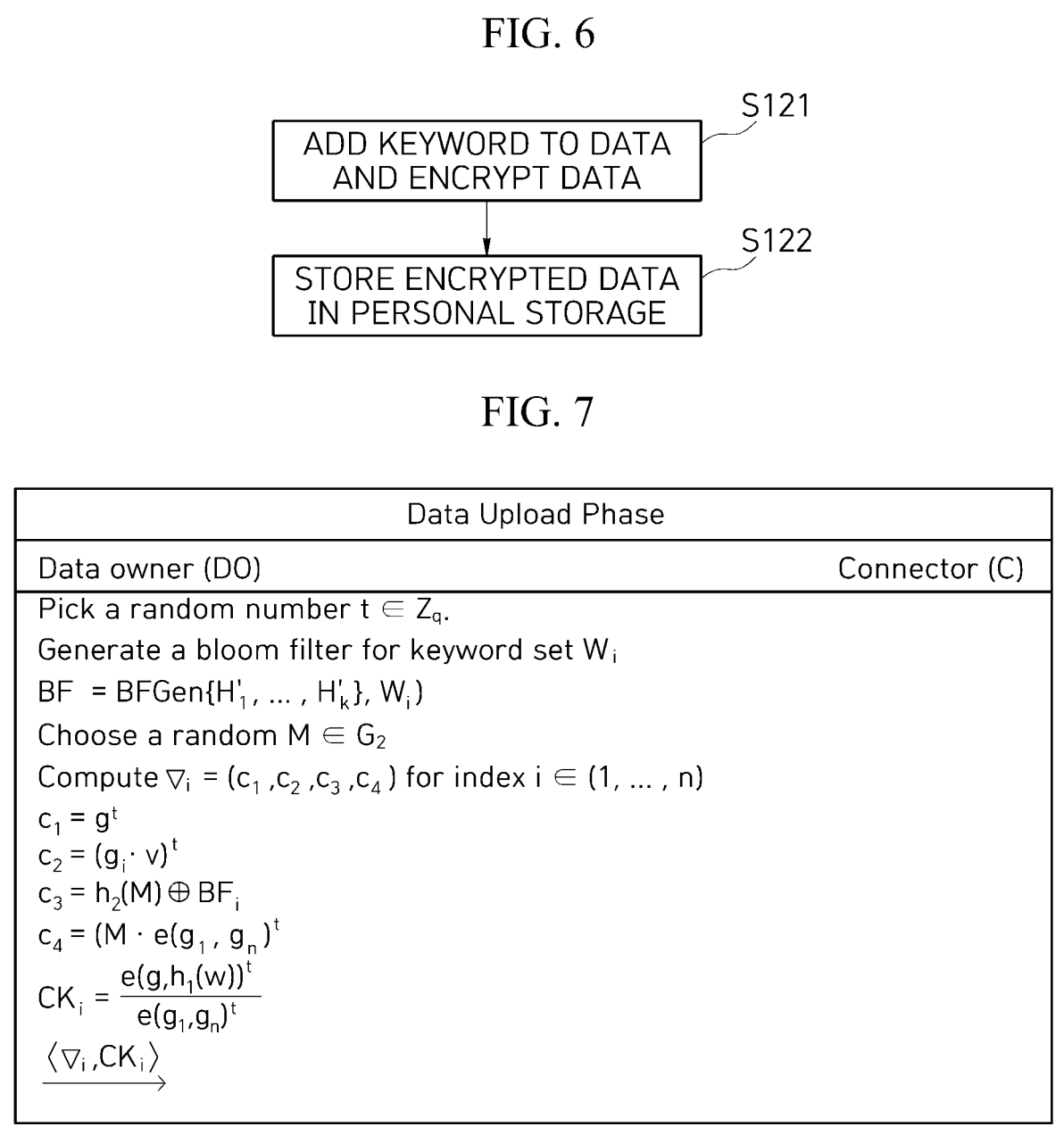

ADD KEYWORD TO DATA AND ENCRYPT DATA    S121

$\downarrow$

STORE ENCRYPTED DATA IN PERSONAL STORAGE    S122

FIG. 7

| Data Upload Phase | |
|---|---|
| Data owner (DO) | Connector (C) |
| Pick a random number $t \in Z_q$.<br>Generate a bloom filter for keyword set $W_i$<br>$BF = BFGen\{H'_1, \dots, H'_k\}, W_i)$<br>Choose a random $M \in G_2$<br>Compute $\nabla_i = (c_1, c_2, c_3, c_4)$ for index $i \in (1, \dots, n)$<br>$c_1 = g^t$<br>$c_2 = (g_i \cdot v)^t$<br>$c_3 = h_2(M) \oplus BF_i$<br>$c_4 = (M \cdot e(g_1, g_n))^t$<br>$CK_i = \dfrac{e(g, h_1(w))^t}{e(g_1, g_n)^t}$<br>$\langle \nabla_i, CK_i \rangle \xrightarrow{\hspace{2cm}}$ | |

FIG. 8

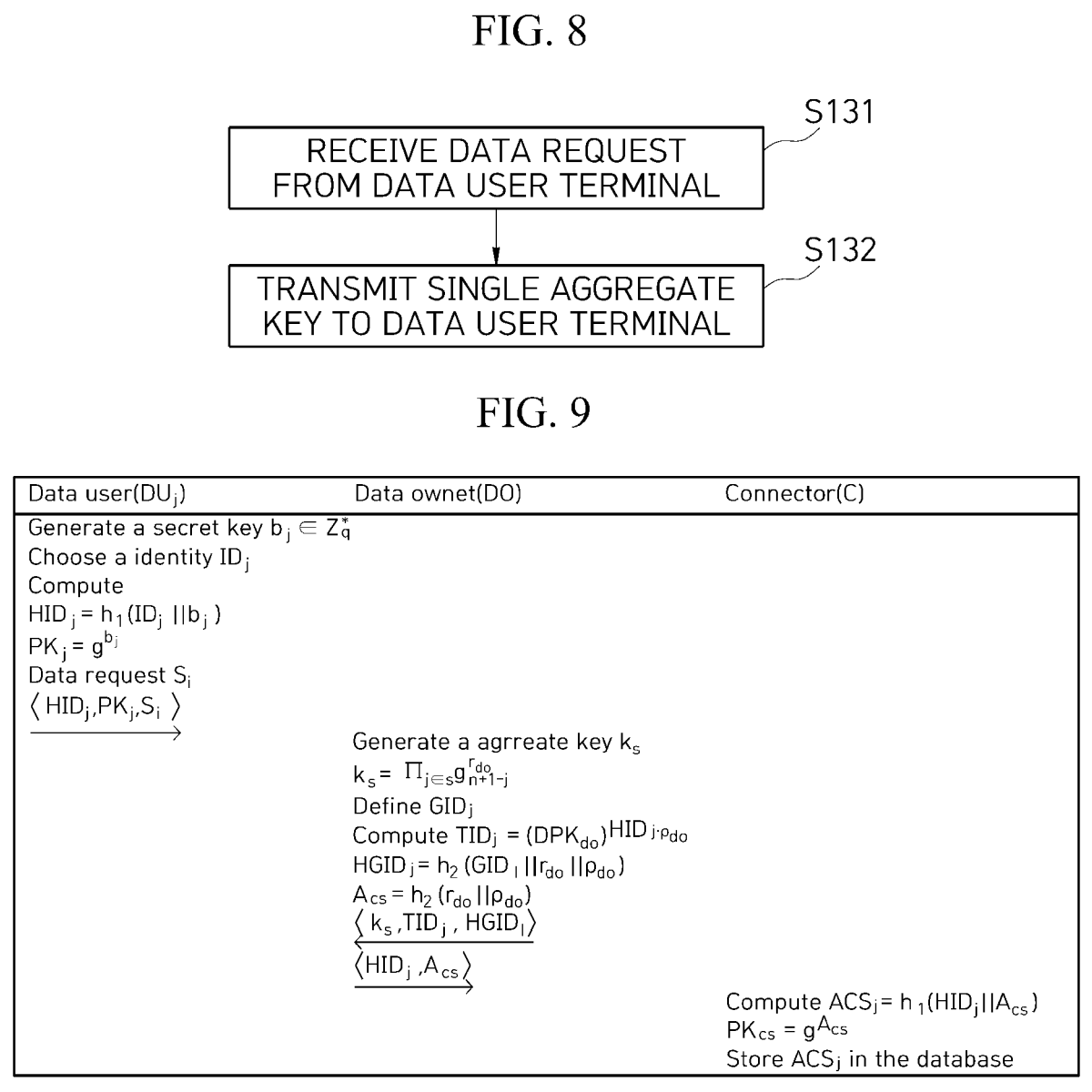

RECEIVE DATA REQUEST
FROM DATA USER TERMINAL — S131

TRANSMIT SINGLE AGGREGATE
KEY TO DATA USER TERMINAL — S132

FIG. 9

| Data user(DU$_j$) | Data ownet(DO) | Connector(C) |
|---|---|---|
| Generate a secret key $b_j \in Z_q^*$ <br> Choose a identity ID$_j$ <br> Compute <br> $HID_j = h_1(ID_j \| b_j)$ <br> $PK_j = g^{b_j}$ <br> Data request $S_i$ <br> $\langle HID_j, PK_j, S_i \rangle$ <br> $\xrightarrow{\hspace{2cm}}$ | Generate a agrreate key $k_s$ <br> $k_s = \Pi_{j \in s} g_{n+1-j}^{r_{do}}$ <br> Define GID$_j$ <br> Compute $TID_j = (DPK_{do})^{HID_j \cdot \rho_{do}}$ <br> $HGID_j = h_2(GID_l \| r_{do} \| \rho_{do})$ <br> $A_{cs} = h_2(r_{do} \| \rho_{do})$ <br> $\overset{\langle k_s, TID_j, HGID_l \rangle}{\xleftarrow{\hspace{1.5cm}}}$ <br> $\overset{\langle HID_j, A_{cs} \rangle}{\xrightarrow{\hspace{1.5cm}}}$ | Compute $ACS_j = h_1(HID_j \| A_{cs})$ <br> $PK_{cs} = g^{A_{cs}}$ <br> Store $ACS_j$ in the database |

FIG. 10

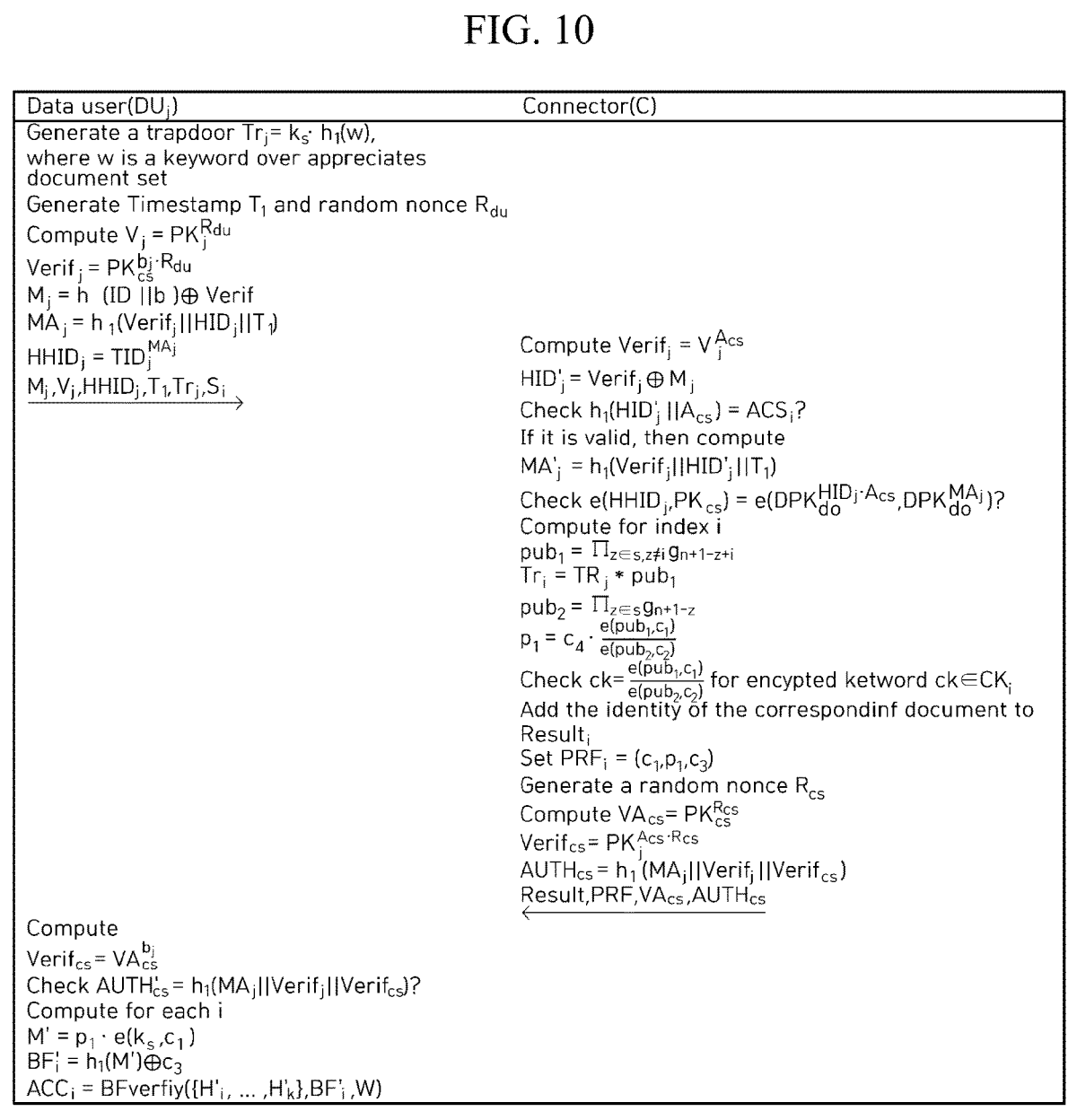

| Data user(DU$_j$) | Connector(C) |
|---|---|
| Generate a trapdoor $Tr_j = k_s \cdot h_1(w)$, where w is a keyword over appreciates document set<br><br>Generate Timestamp $T_1$ and random nonce $R_{du}$<br><br>Compute $V_j = PK_j^{R_{du}}$<br><br>$Verif_j = PK_{cs}^{b_j \cdot R_{du}}$<br><br>$M_j = h \ (ID \ \|b \ ) \oplus Verif$<br><br>$MA_j = h_1(Verif_j \| HID_j \| T_j)$<br><br>$HHID_j = TID_j^{MA_j}$<br><br>$\underrightarrow{M_j, V_j, HHID_j, T_1, Tr_j, S_i}$ | |
| | Compute $Verif_j = V_j^{A_{cs}}$<br><br>$HID'_j = Verif_j \oplus M_j$<br><br>Check $h_1(HID'_j \| A_{cs}) = ACS_i$?<br><br>If it is valid, then compute<br>$MA'_j = h_1(Verif_j \| HID'_j \| T_1)$<br><br>Check $e(HHID_j, PK_{cs}) = e(DPK_{do}^{HID_j \cdot A_{cs}}, DPK_{do}^{MA_j})$?<br><br>Compute for index i<br>$pub_1 = \Pi_{z \in s, z \neq i} g_{n+1-z+i}$<br><br>$Tr_i = TR_j * pub_1$<br><br>$pub_2 = \Pi_{z \in s} g_{n+1-z}$<br><br>$p_1 = c_4 \cdot \frac{e(pub_1, c_1)}{e(pub_2, c_2)}$<br><br>Check $ck = \frac{e(pub_1, c_1)}{e(pub_2, c_2)}$ for encrypted ketword $ck \in CK_i$<br><br>Add the identity of the correspondinf document to Result$_i$<br><br>Set $PRF_i = (c_1, p_1, c_3)$<br><br>Generate a random nonce $R_{cs}$<br><br>Compute $VA_{cs} = PK_{cs}^{R_{cs}}$<br><br>$Verif_{cs} = PK_j^{A_{cs} \cdot R_{cs}}$<br><br>$AUTH_{cs} = h_1(MA_j \| Verif_j \| Verif_{cs})$<br><br>$\underleftarrow{Result, PRF, VA_{cs}, AUTH_{cs}}$ |
| Compute<br><br>$Verif_{cs} = VA_{cs}^{b_j}$<br><br>Check $AUTH'_{cs} = h_1(MA_j \| Verif_j \| Verif_{cs})$?<br><br>Compute for each i<br>$M' = p_1 \cdot e(k_s, c_1)$<br><br>$BF'_i = h_1(M') \oplus c_3$<br><br>$ACC_i = BFverfiy(\{H'_i, \dots, H'_k\}, BF'_i, W)$ | |

DATA OWNER DEVICE AND ITS DATA MANAGEMENT METHOD FOR USER-CENTRIC DATA MANAGEMENT THROUGH AUTHENTICATION AND KEY AGREEMENT BASED ON SINGLE AGGREGATE KEY

CROSS-REFERENCE TO RELATED APPLICATION

This application claims priority to and the benefit of Korean Patent Application No. 10-2023-0041866, filed on Mar. 30, 2023, the disclosure of which is incorporated herein by reference in its entirety.

BACKGROUND

(a) Technical Field

The present invention relates to a data owner terminal and its data management method for user-centric data management through authentication and key agreement based on a single aggregate key.

(b) Background Art

Authentication methods are widely used for safe communication and data exchange between correct users and users, between users and devices, and between devices and devices. In general, when users access and manage their own data, they register their identity information and key secret parameters in a central management system that they trust in advance, and manage stored data by requesting access control to their own data from the central management system. However, in a data access control method through the authentication, an entity that encrypts and decrypts actual data is a trusted agency, and when the trusted agency is exposed to malicious attacks or does not operate, not only can it cause serious security issues, but it can also violate user data sovereignty.

In addition, since data is encrypted and decrypted with one key, when an encryption/decryption key leaks, all data may leak, and detailed management of each data is impossible.

To solve this problem, methods for allowing users to directly encrypt data and perform key management and access control functions are being studied. In these methods, users directly manage keys for encrypted data, but the actual data is stored in a cloud and the data access control is performed by delegating authorization to the cloud. However, the existing methods may cause the same problems when the cloud is exposed to attack or does not operate, and it is impossible to guarantee the user data sovereignty.

Therefore, there is a need for an aggregate key-based authentication and key agreement method that allows detailed user-centric data management where users may manage both their own data and keys.

SUMMARY OF THE DISCLOSURE

The present invention provides a data owner terminal and its data management method for user-centric data management through authentication and key agreement based on a single aggregate key that can guarantee user data sovereignty and privacy by allowing users to manage and control access to their own data instead of allowing a central management system or a cloud to manage and control access to the data.

However, the problems to be solved by the present invention are not limited to the problems described above, and other problems may be present.

According to a first aspect of the present invention, a data management method of user-centric data management through authentication and key agreement based on a single aggregate key that is performed by a data owner terminal includes: adding a keyword to data and encrypting the data according to a predetermined encryption technique; storing the encrypted data in a personal storage; receiving a data request from a data user terminal; and transmitting a single aggregate key required for the encrypted data to the data user terminal in response to the data request.

In addition, according to a second aspect of the present invention, a data owner terminal for user-centric data management through authentication and key agreement based on a single aggregate key includes: a communication module that transmits and receives data to and from at least one data user terminal and a personal storage; a memory in which a program for managing encrypted data based on a single aggregate key is stored; and a processor that adds a keyword to the data and stores the encrypted data in the personal storage according to a predetermined encryption technique by executing the program stored in the memory and transmits the single aggregate key required for the encrypted data through the communication module by receiving a data request from the data user terminal.

A computer program according to another aspect of the present invention for solving the above-described problem executes a method for user-centric data management through authentication and key agreement based on an aggregate key in a detailed description of other specific details of a single invention, and is stored in a computer readable recording medium.

Other specific details of the invention are included in the detailed description and drawings.

BRIEF DESCRIPTION OF THE DRAWINGS

FIG. 4 is a flow chart for describing a user initial setting step in an embodiment of the present invention.

FIG. 5 is a diagram illustrating an algorithm for describing the user initial setting step in the embodiment of the present invention.

FIG. 6 is a flowchart for describing a data upload step in an embodiment of the present invention.

FIG. 7 is a diagram illustrating an algorithm for describing the data upload step in the embodiment of the present invention.

FIG. 8 is a flow chart for describing a data request, aggregation, and transmission step in an embodiment of the present invention.

FIG. 9 is a diagram illustrating an algorithm for describing the data request, aggregation, and transmission step in the embodiment of the present invention.

FIG. 10 is a diagram illustrating an algorithm for describing a data reception and verification step in an embodiment of the present invention.

DETAILED DESCRIPTION

Figure 1:
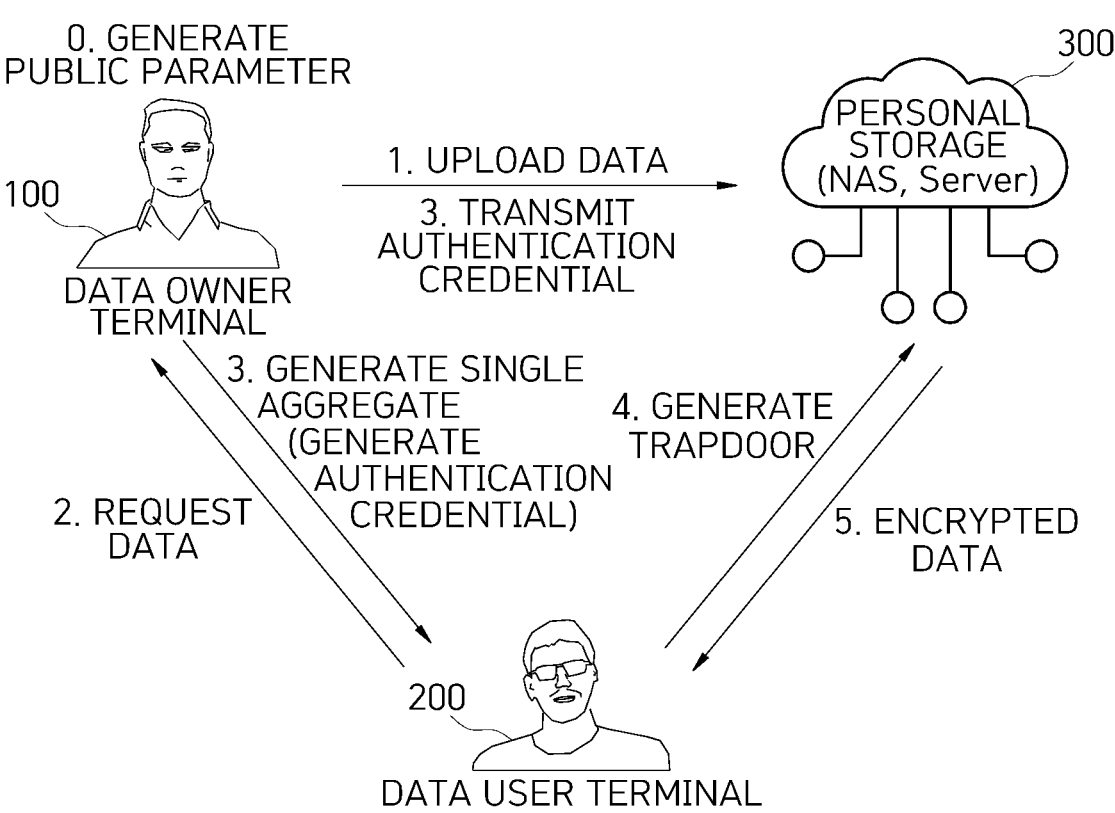
FIG. 1 is a diagram for describing the overall system in an embodiment of the present invention.

Various advantages and features of the present invention and methods accomplishing them will become apparent from the following description of embodiments with reference to the accompanying drawings. However, the present invention is not limited to embodiments to be described below, but may be implemented in various different forms, these embodiments will be provided only in order to make the present invention complete and allow those skilled in the art to completely recognize the scope of the present invention, and the present invention will be defined by the scope of the claims.

Terms used in the present specification are for explaining embodiments rather than limiting the present invention. Unless otherwise stated, a singular form includes a plural form in the present specification. Throughout this specification, the term "comprises" and/or "comprising" will be understood to imply the inclusion of stated constituents but not the exclusion of any other constituents. Like reference numerals refer to like components throughout the specification and "and/or" includes each of the components mentioned and includes all combinations thereof. Although "first," "second," and the like are used to describe various components, it goes without saying that these components are not limited by these terms. These terms are used only to distinguish one component from other components. Therefore, it goes without saying that the first component mentioned below may be the second component in the technical scope of the present invention.

Unless defined otherwise, all terms (including technical and scientific terms) used in the present specification have the same meanings commonly understood by those skilled in the art to which the present invention pertains. In addition, terms defined in commonly used dictionary are not ideally or excessively interpreted unless explicitly defined otherwise.

FIG. 1 is a diagram for describing the overall system in an embodiment of the present invention.

An embodiment of the present invention includes a data owner terminal, a data user terminal, and a personal storage.

The data owner terminal is an entity that independently manages data as an owner of data. Upon receiving a data request from the data user terminal, the data owner terminal adds keywords to data and related data, encrypts the data and related data, and stores the encrypted data and related data in its own personal storage. A single aggregate key corresponding to the encrypted data is provided to the data user terminal.

The data user terminal requests data from the data owner terminal and receives the single aggregate key required to decrypt the data. The data user terminal may generate a trapdoor to search data stored in the personal storage of the data owner based on the single aggregate key and keyword, receive encrypted data through authentication with the personal storage, and decrypt the received data to acquire data. Meanwhile, when the data user terminal directly receives data from the data owner terminal, the authentication with the personal storage does not need to be performed.

The personal storage is a network attached storage (NAS) or a data server installed by an individual data owner. The personal storage searches data and performs keyword verification through a trapdoor received from a data user when the data user is in an offline state.

Figure 2:
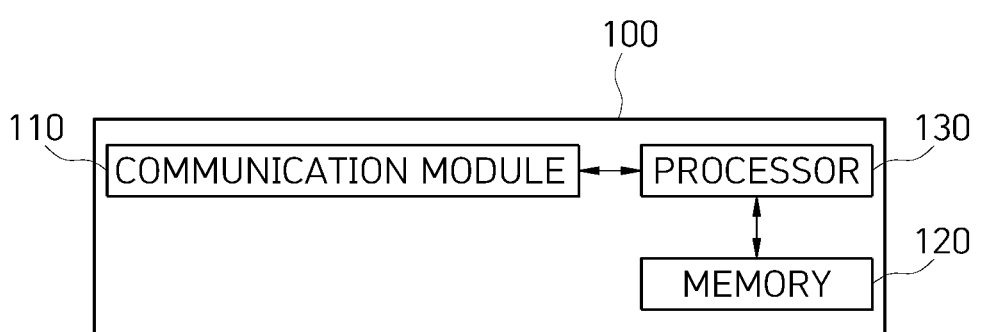
FIG. 2 is a block diagram of a data owner terminal according to an embodiment of the present invention.

FIG. 2 is a block diagram of a data owner terminal according to an embodiment of the present invention.

The data owner terminal according to the embodiment of the present invention includes a communication module, a memory, and a processor.

A communication module 110 transmits and receives data to and from at least one data user terminal and a personal storage, and transmits and receives data between other internal components or performs communication with an external device such as an external server. The communication module 110 may include both a wired communication module and a wireless communication module. The wired communication module may be implemented as a power line communication device, a telephone line communication device, cable home (MoCA), Ethernet, IEEE1294, an integrated wired home network, and an RS-485 control device. In addition, the wireless communication module may be configured in a module for implementing functions such as wireless LAN (WLAN), Bluetooth, HDR WPAN, UWB, ZigBee, Impulse Radio, 60 GHz WPAN, Binary-CDMA, wireless USB technology and wireless HDMI technology, 5th (5G) generation communication, long term evolution-advanced (LTE-A), long term evolution (LTE), and wireless fidelity (Wi-Fi).

The memory 120 stores programs for managing encrypted data based on the single aggregate key. Here, the memory 120 collectively refers to a non-volatile storage device that continuously maintains stored information even when power is not supplied and a volatile storage device. For example, the memory 120 may include NAND flash memories such as a compact flash (CF) card, a secure digital (SD) card, a memory stick, a solid-state drive (SSD), and a micro SD card, magnetic computer storage devices such as a hard disk drive (HDD), and optical disc drives such as CD-ROM and DVD-ROM.

The processor 130 may execute software, such as a program stored in the memory, to control at least one other component (e.g., hardware or software component) of the data owner terminal 100, and may perform various data processing or calculations.

Hereinafter, a method performed by the data owner terminal in an embodiment of the present invention will be described in detail.

Figure 3:
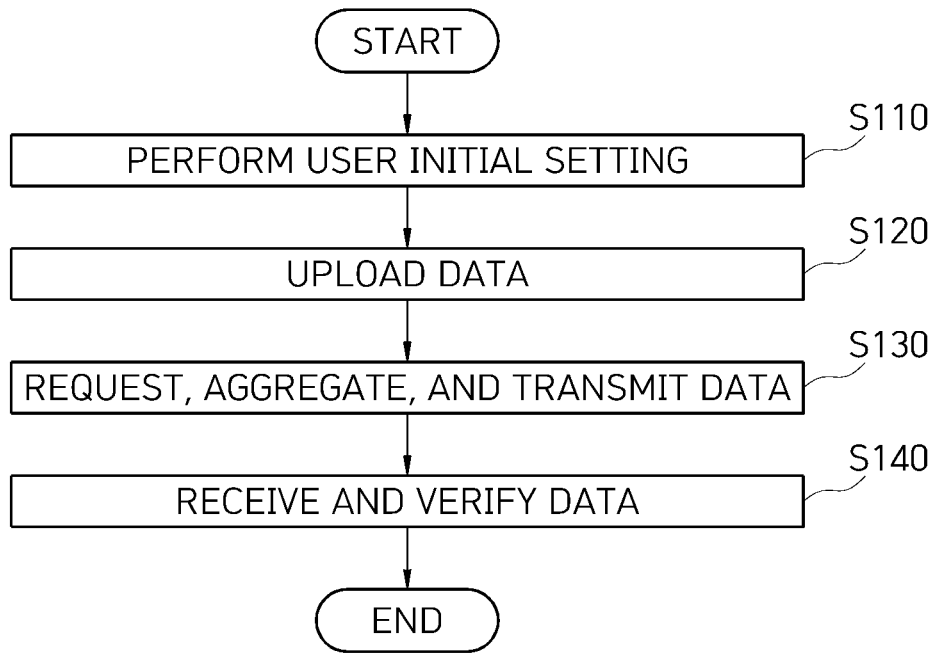
FIG. 3 is a flowchart of a data management method of user-centric data management through authentication and key agreement based on a single aggregate key according to an embodiment of the present invention.

FIG. 3 is a flowchart of a data management method of user-centric data management through authentication and key agreement based on a single aggregate key according to an embodiment of the present invention.

An embodiment of the present invention largely includes a total of four steps: a user initial setting step (S110), a data upload step (S120), a data request, aggregation, and transmission step (S130), and a data reception and verification step (S140).

FIG. 4 is a flow chart for describing a user initial setting step in an embodiment of the present invention. FIG. 5 is a diagram illustrating an algorithm for describing the user initial setting step in the embodiment of the present invention.

The user initial setup step (S110) is a process in which the data owner terminal generates system parameters, personal secrets, and public parameters to use the technology.

In an embodiment, the data owner terminal generates a bilinear map and public parameters to share data with the data user terminal and store the data in the personal storage (S111).

Specifically, the data owner terminal generates a bilinear map $B=(q, G_1, G_2, e)$ that includes first multiplication elliptic curve groups $G_1$, second multiplication elliptic curve groups $G_2$ where calculation results of the plurality of first multiplication elliptic curve groups are output, and an order q and identity element e of the first multiplication elliptic curve group. In this case, q is the order of the group, that is, the order of $G_1$, which means the number of elements belonging to the group. As q increases, stability improves. e is $G_1 \times G_1 \to G_2$.

In addition, $G_1$ and $G_2$ refer to the first and second multiplication elliptic curve groups. The group G is a group required for pairing calculation, and when the groups $G_1$ and $G_2$ are calculated, the calculation result is output to the group $G_2$. In this case, the multiplication elliptic curve group is called a commutative group or Abelian group and means a closed system in which an identity element, an inverse element, an associative law, and a commutative law are established.

Next, the data owner terminal selects a random generator $g \in G_1$ from the first multiplication elliptic curve group $G_2$ and selects an arbitrary integer random value $\alpha \in Z_q$. Here, the random value may be generated by the random generator.

Then, based on the selected random generator and arbitrary random value, a public parameter $g_i = g^{\alpha_i}$ required for encryption and keyword verification of each data are calculated and generated within a predetermined range $1 \le i \le 2n$. Here, the public parameter is a public parameter generated by the data owner as a parameter required to perform encryption on each data and verify data keywords.

Next, the data owner terminal generates a hash function corresponding to a bloom filter to verify the encrypted data and keywords (S112).

An embodiment of the present invention applies encryption to data to protect data confidentiality and applies the bloom filter for keyword verification. In this case, the bloom filter is a kind of probabilistic data structure and is used to store and search large amounts of data. In the present invention, it is used to verify whether the encrypted data includes correct keywords.

Specifically, the data owner terminal selects a master secret key $$r_{do} \in Z_q^*$$

and a general secret key $$\rho_{do} \in Z_q^*$$

for data use. In this case, the master secret key $$r_{do} \in Z_q^*$$

is a secret key for the data use of the individual data user, and the general secret key $$\rho_{do} \in Z_q^*$$

is a secret key to be used when delegating use authorization of data in the future.

Next, the data owner terminal generates a first hash function $h_1: 0,1^* \to Z_q$ that returns a hash result value as an integer value and a second hash function $h_2: 0,1^* \to G_1$ that returns the hash result value as a value of the first multiplication elliptic curve group.

Next, the data owner terminal sets an m-bit bloom filter and generates a group $$H_1', \ldots, H_k'$$

of k independent hash functions for use. In an embodiment of the present invention, k independent hash functions may be generated to verify k keywords.

Next, the data owner terminal calculates a first public key $PK_{do} = g^{r_{do}}$ for encrypting data and a second public key $DPK_{do} = g^{\rho_{do}}$ for authentication between the personal storage and the data user (S113).

Finally, the data owner terminal distributes a bilinear map B, A public parameter $(g, g_1, \ldots, g_n)$, first and second public keys $DPK_{do}$, $PK_{do}$, and a hash function $$h_1, h_2, \{H_1', \ldots, H_k'\}. \tag{S114}$$

FIG. 6 is a flowchart for describing a data upload step in an embodiment of the present invention. FIG. 7 is a diagram illustrating an algorithm for describing the data upload step in the embodiment of the present invention.

The data upload step S120 is a process in which the data owner terminal uploads its data to the personal storage.

The data upload step (S120) may include adding a keyword to data and encrypting the data according to a predetermined encryption technique (S121), and storing the encrypted data in the personal storage (S122). During this process, the data owner terminal generates the bloom filter to confirm whether the keyword is included in a document set. The data owner terminal may encrypt a set $CK_i$ of keywords, generate a public auxiliary value $\nabla_i$ for an index, and transmit the generated public auxiliary value $\nabla_i$ to the personal storage.

Specifically, the data owner terminal selects an encryption key value $t \in Z_q$, which is capable of actual search and is a random value for encrypting data. Then, the bloom filter is generated by setting an identifiable set of keywords $W_i$ for each data and a file index $i \in \{1, 2, \ldots, n\}$ for each keyword. The bloom filter is calculated as $$BF_i = BFGen(\{H_1', \ldots, H_k'\}, W_i).$$

In this case, the bloom filter includes keyword values, and performs a function of using, by a verifier, the bloom filter later to verify whether the keyword is properly included.

Next, the data owner terminal calculates a public auxiliary value based on an arbitrary element value and an encryption key value selected from the second multiplication elliptic curve group, and generates a set of encrypted keywords for each keyword in the set of keywords.

That is, the data owner terminal calculates the public auxiliary value $\nabla_i$ for index i based on the arbitrary element value $M \in G_2$ and encryption key value $t \in Z_q$ selected from the second multiplication elliptic curve group. In this case, the public auxiliary value $\nabla_i$ is composed of first to fourth public auxiliary values $c_1$, $c_2$, $c_3$, and $c_4$, and may include a keyword verification value, auxiliary parameters for decryption, encryption data, etc.

The first public auxiliary value $c_1=g^t$ is calculated based on the random generator and the encryption key value. The second public auxiliary value $c_2=(g_i \cdot PK_{do})^t$ is calculated based on the random generator, the first public key, and the encryption key value. The third public auxiliary value $c_3=h_2$ $(M) \oplus BF_i$ is calculated based on the hash function, the selected arbitrary element value, and the bloom filter. The fourth public auxiliary value $c_4=M \cdot e(g_1, g_n)^t$ is calculated based on the selected arbitrary element value, the identity element, the random generator, and the encryption key value.

The data owner terminal calculates a set $$CK_i = \frac{e(g, h_1(w))^t}{e(g_1, g_n)^t}$$

of encrypted keywords corresponding to each keyword w in the set of keywords $W_i$, and finally stores the public auxiliary value $\nabla_i$ and the set $CK_i$ of encrypted keywords in the personal storage. Here, the set of encrypted keywords is used to verify whether the correct data has been searched in the later data search step.

FIG. 8 is a flow chart for describing a data request, aggregation, and transmission step in an embodiment of the present invention. FIG. 9 is a diagram illustrating an algorithm for describing the data request, aggregation, and transmission step in the embodiment of the present invention.

The data request, aggregation, and transmission step (S130) is a process of transmitting the single aggregate key for multiple data requested by the data owner terminal to the data user terminal as the data user terminal requests data from the data owner terminal.

The data request, aggregation, and transmission step (S130) may include receiving, by the data owner terminal, the data request from the data user terminal (S131), and transmitting the single aggregate key required for the encrypted data to the data user terminal in response to the data request (S132).

First, in order for the data user terminal to request a data set $S_i$, the data user terminal calculates a hash ID $HID_j$ and a third public key $PK_j$ and requests data from the data owner terminal. Here, the hash ID $HID_j=h_1(ID_j \| b_j)$ and the third public key $PK_j=g^{b_j}$ are generated based on the secret key $$b_j \in Z_q^*$$

and unique ID $ID_j$ for identity authentication by the data user terminal. The data user terminal safely transmits $<HID_j, PK_j, S_i>$ to the data owner terminal, including its desired data set $S_i$.

Next, the data owner terminal that receives the data request from the data user terminal generates the single aggregate key $$k_s = \Pi_{j \in s} g_{n+1-j}^{r_{do}}$$

corresponding to the data set $S_i$. Here, the single aggregate key refers to one aggregated key corresponding to multiple requested data.

Next, the data owner terminal creates a group ID $GID_l$ for delegation and granting of authorization among data users for the data set. That is, the data owner may define a group and use the group ID $GID_l$ to determine which data users may delegate or receive authorization to or from each other. Through this, the data owner may manage a list of data owners belonging to the group ID when a new data user is added or an existing data user wants to leave the group.

Next, the data owner terminal generates first and second parameters with authentication credentials that may allow the data user and the personal storage to authenticate each other.

In addition, the data owner terminal may generate the first parameter including the single aggregate key, the token ID, and the hashed group ID to verify the identity of the data user, and transmit the first parameter to the data user terminal.

That is, the data owner terminal may generate a token ID $TID_j=(DPK_{do})^{HID_j * \rho_{do}}$ based on the general secret key $\rho_{do}$ for the use authorization of data, the hashed ID $HID_j$, and the second public key $DPK_{do}$. In addition, the hashed group ID $HGID_j=h_2(GID_l \| r_{do} \| \rho_{do})$ may be generated by applying the group ID $GID_l$, the master secret key $r_{do}$, and the general secret key $\rho_{do}$ to the second hash function $h_2$.

Next, the token ID $TID_j$, the hashed group ID $HGID_j$, and the single aggregate key $k_s$ may be generated as the first parameter $<k, TID_j, HGID_l>$ and transmitted to the data user terminal.

In addition, the data owner terminal may generate the second parameter $<HID_j, A_{cs}>$ to verify the identity of the data user in the personal storage and transmit the generated second parameter $<HID_j, A_{cs}>$ to the personal storage. For the second parameter, a result value $A_{cs}=h_2(r_{do} \| \rho_{do})$ obtained by applying the hashed ID $HID_j$, the master secret key $r_{do}$, and the general secret key $\rho_{do}$ to the second hash function $h_2$ may be generated as the second parameter $<HID_j, A_{cs}>$.

The personal storage may use the second parameter to calculate the authentication credential $ACS_i$ and store the calculated authentication credential $ACS_i$ in its own database. That is, as the personal storage receives a message requesting data reception from the data owner terminal, the public verification parameter $ACS_i=h_2(HID_j \| A_{cs})$ and public key $PK_{cs}=g^{A_{cs}}$ may be calculated based on the second parameter and the calculated public verification parameter $ACS_i$ and public key $PK_{cs}$ may be stored in the database.

FIG. 10 is a diagram illustrating an algorithm for describing a data reception and verification step in an embodiment of the present invention.

The data reception and verification step (S140) is a process of receiving the requested data from the personal storage or the data owner, decrypting the received data using the single aggregate key, and then verifying the keyword of the corresponding data.

Specifically, the data user terminal applies keywords to the single aggregate key and the hash function to generate a trapdoor $Tr_j=k_s \cdot h_1(\omega)$ of keyword $\omega$ for data search in the personal storage. The trapdoor is a verification value that may verify whether the encrypted keyword and single aggregate key are correct values, and is associated with all data sets related to the single aggregate key of the data user.

Next, the data user terminal generates a timestamp $T_1$ and a random value $R_{du}$. Here, the random value $R_{du}$ refers to the value required for authentication of the trapdoor request. Then, the data user terminal calculates $$V_j = PK_j^{R_{du}},$$

$$Verif_j = PK_{cs}^{b_j \cdot R_{du}},$$

$$M_j = h_1(ID_j \| b_j) \oplus Verif_j,$$

$$MA_j = h_1(Verif_j \| HID_j \| T_1) \text{ and}$$

$$HHID_j = TID_j^{MA_j}.$$

Next, the data user terminal generates the third parameter $\langle M_j, V_j, HHID_j, T_1, Tr_j \| S_i \rangle$ for identity verification between the personal storage and the data user, and transmits the trapdoor and third parameter to the personal storage through a public channel for a search query.

The personal storage, which receives the message from the data user terminal, calculates $$Verif_j = V_j^{A_{cs}} \text{ and}$$

$$HID'_j = Verif_i \oplus M_j.$$

The personal storage checks whether $$h_1 = \left(HID'_j \| A_{cs}\right) = ACS_i$$

is correct and calculates $$MA'_j = h_1\left(Verif_j \| HID'_j\right)$$

when it is valid.

Next, the personal storage confirms whether $$e(HHID_j, PK_{cs}) = e\left(DPK_{do}^{HHID_j \cdot A_{cs}}, DPK_{do}^{MA_j}\right)$$

match to prove the identity of the data user requesting the data. When the value is valid, the personal storage calculates, $$pub_1 = \pi_{z \in s, z \neq i} g_{n+1-z+i}, \; Tr_i = TR_j \cdot pub_1, \; pub_2 = \pi_{z \in s} g_{n+1-z}, \text{ and}$$

$$p_1 = c_4 \cdot \frac{e(pub_1, c_1)}{e(pub_2, c_2)}$$

for index i.

Next, the personal storage confirms whether $$ck = \frac{e(Tr_i, c_1)}{e(pub_2, c_2)}$$

is correct to verify that the encrypted data includes the correct keywords, along with the single aggregate key.

The personal storage adds keyword-based search results of the corresponding document to Result, and also sets $PRF_i=(c_1, p_1, c_3)$. The personal storage generates a random value $R_{cs}$ to calculate $$VA_{cs} = PK_{cs}^{R_{cs}}, \; Verif_{cs} = PK_j^{A_{cs} \cdot R_{cs}}$$

and $AUTH_{CS}=h_1(MA_j \| Verif_j \| Verif_{cs})$. Thereafter, the personal storage transmits $\langle Result, PRF, VA_{cs}, AUTH_{cs} \rangle$ to the user terminal through the public channel.

Next, as the verification of the identity and keywords of the data user from the personal storage is completed, the data user terminal may receive the encrypted data from the personal storage. Specifically, after receiving a message from the personal storage, the data user terminal calculates $$Verif_{cs} = VA_{cs}^{b_j}$$

to confirm whether the authentication parameter $$AUTH'_{cs} = h_1\left(MA_j \| Verif_j \| Verif_{cs}\right)$$

between the personal storage and the data user terminal matches. When the confirmation result matches, the data user terminal calculates the message decryption value $M'=p_1 \cdot e(k_s, c_1)$ and the bloom filter result value $$BF'_i = h_1(M') \oplus c_3 \text{ and}$$

$$ACC_i = BFverify(\{H'_1, \ldots, H'_k\}, BF'_i, W)$$

for each file index i. When the keyword w exists in the received data, the value of $ACC_i=1$ or $ACC_i=0$ may return.

Meanwhile, in the above description, steps S110 to S140 may be further divided into additional steps or combined into fewer operations according to an implementation example of the present invention. Also, some operations may be omitted if necessary, and an order between operations may be changed. In addition, even if other content is omitted, the contents described in FIGS. 1 to 2 and the contents described in FIGS. 3 to 10 may be mutually applied.

The data management method of user-centric data management through authentication and key agreement based on a single aggregate key according to an embodiment of the present invention described above is implemented as a program (or application) to be executed in combination with a computer, which is hardware and may be stored on media.

In order for the computer to read the program and execute the methods implemented as the program, the program may include a code coded in a computer language such as C, C++, JAVA, Ruby, Python, or machine language that the processor (CPU, GPU) of the computer may read through a device interface of the computer. Such code may include functional code related to a function or such defining functions necessary for executing the methods and include an execution procedure related control code necessary for the processor of the computer to execute the functions according to a predetermined procedure. In addition, the code may further include a memory reference related code for which location (address street number) in an internal or external memory of the computer the additional information or media necessary for the processor of the computer to execute the functions is to be referenced at. In addition, when the processor of the computer needs to communicate with any other computers, servers, or the like located remotely in order to execute the above functions, the code may further include a communication-related code for how to communicate with any other computers, servers, or the like using the communication module of the computer, what information or media to transmit/receive during communication, and the like.

The storage medium is not a medium that stores videos therein for a while, such as a register, a cache, a memory, or the like, but means a medium that semi-permanently stores the videos therein and is readable by an apparatus. Specifically, examples of the storage medium include, but are not limited to, ROM, random-access memory (RAM), CD-ROM, a magnetic tape, a floppy disk, an optical image storage device, and the like. That is, the program may be stored in various recording media on various servers accessible by the computer or in various recording media on the computer of the user. In addition, media may be distributed in a computer system connected by a network, and a computer-readable code may be stored in a distributed manner.

According to an embodiment of the present invention described above, the data owner can directly manage the key for the encrypted data and the access control to the data without the central trusted agency.

In particular, when the data owner generates different detailed keys for multiple data and receives a request of multiple data from data users, it is possible to generate a single aggregate key and easily transmit the generated single aggregate key.

In addition, since the data owner may insert keywords into data when encrypting the data and verify the authenticity of the data through the keywords, it is possible to improve the reliability in the distributed environment.

The present invention proposed in this way can be applied to the distributed environment to ensure the user data sovereignty and the user privacy.

The effects of the present invention are not limited to the above-described effects, and other effects that are not mentioned may be obviously understood by those skilled in the art from the following description.

The above description of the present invention is for illustrative purposes, and those skilled in the art to which the present invention pertains will understand that it may be easily modified to other specific forms without changing the technical spirit or essential features of the present invention. Therefore, it should be understood that the above-mentioned embodiments are exemplary in all aspects but are not limited thereto. For example, each component described as a single type may be implemented in a distributed manner, and similarly, components described as distributed may be implemented in a combined form.

It is to be understood that the scope of the present invention will be defined by the claims rather than the above-described description and all modifications and alternations derived from the claims and their equivalents are included in the scope of the present invention.

What is claimed is:

1. A data management method of user-centric data management through authentication and key agreement based on a single aggregate key that is performed by a data owner terminal, the data management method comprising:

adding a keyword to data and encrypting the data according to a predetermined encryption technique;

storing the encrypted data in a personal storage;

receiving a data request from a data user terminal;

transmitting a single aggregate key required for the encrypted data to the data user terminal in response to the data request;

generating a bilinear map and a public parameter for sharing the data with the data user terminal and storing the data in the personal storage;

generating a hash function corresponding to a bloom filter for verification of the encrypted data and the keyword;

calculating a first public key for encryption of the data and a second public key for authentication between the personal storage and a data user; and distributing the bilinear map, the public parameter, the hash function, and the first and second public keys.

2. The method of claim 1, wherein, in the generating of the bilinear map and the public parameter for sharing the data with the data user terminal and storing the data in the personal storage, the bilinear map, which includes first multiplication elliptic curve groups, second multiplication elliptic curve groups where calculation results of the plurality of first multiplication elliptic curve groups are output, an order and identity element of the first multiplication elliptic curve group, is generated.

3. The method of claim 2, wherein the generating of the bilinear map and the public parameter for sharing the data with the data user terminal and storing the data in the personal storage includes:

selecting a random generator from the first multiplication elliptic curve group; and generating the public parameter required for encryption of each data and keyword verification based on the selected random generator and any random value.

4. The method of claim 1, wherein the generating of the hash function corresponding to the bloom filter for the verification of the encrypted data and the keyword includes:

selecting a master secret key for use of the data and a general secret key for delegating use authorization of the data;

generating a first hash function that returns a hash result value as an integer value and a second hash function that returns the hash result value as a first multiplication elliptic curve group value; and generating a group of independent hash functions for the bloom filter.

5. The method of claim 4, wherein, in the generating of the group of independent hash functions for the bloom filter, a group including k independent hash functions for verification of k keywords through the bloom filter is generated.

6. The method of claim 3, wherein the adding of the keyword to the data and encrypting the data according to the predetermined encryption technique includes:

selecting an encryption key value for encrypting the data;

generating the bloom filter by setting a set of identifiable keywords for each of the data and indexes for each keyword;

calculating a public auxiliary value based on an arbitrary element value selected from the second multiplication elliptic curve group and the encryption key value; and generating a set of keywords encrypted for each keyword in the set of keywords.

7. The method of claim 6, wherein the calculating of the public auxiliary value based on the arbitrary element value selected from the second multiplication elliptic curve group and the encryption key value includes:

calculating a first public auxiliary value generated based on the random generator and the encryption key value;

calculating a second public auxiliary value generated based on the random generator, the first public key, and the encryption key value;

calculating a third public auxiliary value generated based on the hash function, the selected arbitrary element value, and the bloom filter; and calculating a fourth public auxiliary value generated based on the selected arbitrary element value, the identity element, the random generator, and the encryption key value.

8. The method of claim 6, wherein the storing of the encrypted data in the personal storage includes storing the public auxiliary value and the set of encrypted keywords in the personal storage.

9. The method of claim 2, wherein the transmitting of the single aggregate key required for the encrypted data to the data user terminal in response to the data request includes:

receiving a request for a hash ID, a third public key, and a data set generated based on a private key for identity authentication from the data user;

generating the single aggregate key corresponding to the data set;

generating a group ID for delegating and granting authorization among data users for the data set;

generating a first parameter including the single aggregate key, a token ID, and a hashed group ID to verify the identity of the data user; and transmitting the first parameter to the data user terminal.

10. The method of claim 9, wherein the generating of the first parameter including the single aggregate key and the group ID to verify the identity of the data user includes:

generating the token ID based on a general secret key for delegating use authorization of the data, the hashed ID, and the second public key for authentication between the personal storage and the data user;

generating a hashed group ID by applying the group ID, a master secret key for use of the data, and the general secret key for delegating the use authorization of the data to a second hash function that returns a hash result value as a first multiplication elliptic curve group value; and generating the token ID, the hashed group ID, and the single aggregate key as the first parameter.

11. The method of claim 10, further comprising:

generating a second parameter to verify the identity of the data user in the personal storage; and transmitting the second parameter to the personal storage.

12. The method of claim 11, wherein, in the generating of the second parameter for verifying the identity of the data user in the personal storage, a result value obtained by applying the hashed ID, the master secret key, and the general secret key to the second hash function is generated as the second parameter.

13. The method of claim 11, wherein the personal storage stores a public verification parameter calculated based on the second parameter in a database upon receiving a data request message from the data user terminal.

14. The method of claim 11, wherein the data user terminal applies a keyword to the single aggregate key and the hash function to generate a trapdoor for data search in the personal storage, generates a third parameter for identity verification between the personal storage and the data user, transmits the third parameter and the trapdoor to the personal storage, receives encrypted data from the personal storage as verification of the identity and keyword of the data user is completed.

15. A data owner terminal for user-centric data management through authentication and key agreement based on a single aggregate key, comprising:

a communication module that transmits and receives data to and from at least one data user terminal and a personal storage;

a memory in which a program for managing encrypted data based on the single aggregate key is stored; and a processor configured to add a keyword to the data and stores the encrypted data in the personal storage according to a predetermined encryption technique by executing the program stored in the memory and transmits the single aggregate key required for the encrypted data through the communication module by receiving a data request from the data user terminal, wherein the processor is further configured to generate a bilinear map and a public parameter for sharing the data with the data user terminal and storing the data in the personal storage, generate a hash function corresponding to a bloom filter for verification of the encrypted data and the keyword, calculate a first public key for encryption of the data and a second public key for authentication between the personal storage and a data user, and distribute the bilinear map, the public parameter, the hash function, and the first and second public keys.

\* \* \* \* \*